US009742017B2

(12) United States Patent
Khandelwal et al.

(10) Patent No.: US 9,742,017 B2
(45) Date of Patent: Aug. 22, 2017

(54) FUEL CELL HAVING MULTIPLE DUPLICATE ANODE SUBSTRATE LAYERS

(71) Applicant: Doosan Fuel Cell America, Inc., Atlanta, GA (US)

(72) Inventors: Manish Khandelwal, South Windsor, CT (US); Nicholas Edward Osepowicz, Broad Brook, CT (US)

(73) Assignee: DOOSAN FUEL CELL AMERICA, INC., Atlanta, GA (US)

( * ) Notice: Subject to any disclaimer, the term of this patent is extended or adjusted under 35 U.S.C. 154(b) by 189 days.

(21) Appl. No.: 14/776,985

(22) PCT Filed: Apr. 2, 2013

(86) PCT No.: PCT/US2013/034919
§ 371 (c)(1),
(2) Date: Sep. 15, 2015

(87) PCT Pub. No.: WO2014/163617
PCT Pub. Date: Oct. 9, 2014

(65) Prior Publication Data
US 2016/0043418 A1    Feb. 11, 2016

(51) Int. Cl.
*H01M 8/04* (2016.01)
*H01M 8/04276* (2016.01)
(Continued)

(52) U.S. Cl.
CPC ..... *H01M 8/04283* (2013.01); *H01M 4/8605* (2013.01); *H01M 8/0245* (2013.01); *H01M 8/0258* (2013.01); *H01M 8/086* (2013.01)

(58) Field of Classification Search
None
See application file for complete search history.

(56) References Cited

U.S. PATENT DOCUMENTS 6,572,996 B1 *    6/2003  Isenberg ............. H01M 8/0625
                                                          429/422
2005/0164059 A1 *  7/2005  Yang .................. H01M 8/2455
                                                          429/440
(Continued)

FOREIGN PATENT DOCUMENTS

EP          2166603 A1    3/2010
WO       2008/051230 A1    5/2008
(Continued)

OTHER PUBLICATIONS

Extended European Search Report for Application No. EP 13 881 414.0 dated Sep. 30, 2016.
(Continued)

*Primary Examiner* — Scott J Chmielecki
(74) *Attorney, Agent, or Firm* — Carlson, Gaskey & Olds

(57) ABSTRACT

The fuel cell (100) includes an oxidant flow plate (212), an adjacent cathode substrate layer (216) having a cathode catalyst (222), a matrix (224) for retaining a liquid electrolyte (230), wherein the matrix (224) is secured adjacent and between the cathode catalyst (222) and an anode catalyst (232). A first anode substrate (102) is secured adjacent the anode catalyst (232), and at least a second duplicate anode substrate layer (108) is secured adjacent the first anode substrate layer (102) for providing greater pore volume for storage of the liquid electrolyte (230) and to limit obstruction of the pore volume of the anode substrates (102, 108). The duplicate anode substrate layer (108) may be partially filled with the liquid electrolyte (230) at the beginning of life of the fuel cell (100).

4 Claims, 2 Drawing Sheets

(51) Int. Cl.
*H01M 8/086* (2016.01)
*H01M 8/0245* (2016.01)
*H01M 8/0258* (2016.01)
*H01M 4/86* (2006.01)

(56) References Cited

U.S. PATENT DOCUMENTS

2010/0028736 A1* 2/2010 Unlu .................. H01M 8/1004
 429/494
2010/0183940 A1* 7/2010 Kang .................. H01M 8/2435
 429/465
2011/0143254 A1* 6/2011 Kongkanand ......... H01M 4/861
 429/483
2012/0141910 A1 6/2012 Jia et al.

FOREIGN PATENT DOCUMENTS

WO   WO 2008/051230 A1 * 5/2008   ............ H01M 8/023
WO   2008/079126 A1   7/2008

OTHER PUBLICATIONS

International Search Report for International application No. PCT/US2013/034919 mailed Jan. 16, 2014.

* cited by examiner

FUEL CELL HAVING MULTIPLE DUPLICATE ANODE SUBSTRATE LAYERS

TECHNICAL FIELD

The present disclosure relates to fuel cells that are suited for usage in transportation vehicles, portable power plants, or as stationary power plants, and the disclosure especially relates to a fuel cell including at least two duplicate anode substrate layers to provide for greater storage of an acid electrolyte within the fuel cell and to minimize liquid acid blockage of gaseous fuel flow through the anode substrates.

BACKGROUND ART

Fuel cells are well known and are commonly used to produce electrical current from hydrogen containing reducing fluid fuel and oxygen containing oxidant reactant streams to power various types of electrical apparatus. Many fuel cells use a liquid electrolyte such as phosphoric acid, and such fuel cells are typically stacked in series to form a well-known fuel cell stack assembly having manifolds and associated plumbing to deliver and remove reactant and exhaust streams, etc.

In the PAFC, a fixed amount of acid is added in the cell, which is referred to as "beginning of life" or "BOL" acid weight. After addition, acid redistributes within the fuel cell components due to the different pore-sizes of components. Electrolyte retaining matrix pores are always 100% filled. This is required for fuel cell operation, otherwise anode and cathode gas would cross through the matrix and become mixed. After filling the matrix layer, remaining acid is distributes into pores of anode and cathode substrate layer before the PAFC commences operation. Typical BOL fill percent in anode and cathode is thirty to forty percent. Some PAFC locations may see a little higher fill percent in the plane form.

During the operational life of the PAFC, acid is lost from the substrate layers due to evaporation into the reactant and product gases. Such loss will decrease the percent fill in the substrate layer during operation. When the average fill level in a substrate reaches one to two percent, then the matrix starts losing the acid. When this condition is reached it is considered that the fuel cell stack has reached its end of life or "EOL". Acid loss is dependent on many factors including a rate of evaporation of the acid into the reactant streams. Therefore, it is goal to have as much acid as possible in the fuel cell stack, or in other words to maximize the BOL acid weight.

Acid can transfer within components of a PAFC by electrochemical pumping or "slosh" during fuel cell operation. This intra-cell acid transfer between the cathode and anode results in different electrolyte content in the porous component on each side of the cell. Acid moves from cathode to anode and increased the anode fill level. A cell which begins with the acid equally divided between the anode and cathode components typically ends up with two-third of the acid on the anode and one-third on the cathode at BOL as a result of normal PAFC operation. Additionally, the BOL fill level on the anode side fuel cell components must not exceed a fill level which is required to obtain sufficient gas phase diffusion through the anode side fuel cell components. Therefore, a fill level of the anode side components is very critical when establishing the initial electrolyte fill level for the cell.

Many efforts have been undertaken to increase a "beginning of life" ("BOL") quantity or weight of acid within a phosphoric acid fuel cell ("PAFC"). For example, U.S. Pat. Nos. 4,035,551 and 4,185,145 both disclose electrolyte reservoirs and methods of making reservoir layers in such fuel cells. These patents include use of varying pore sizes and varying hydrophilic properties to enhance storage of liquid acid electrolytes. U.S. Pat. Nos. 4,345,008 and 4,414,291 also teach PAFCs that include condensation zones to precipitate volatilized acid electrolyte out of a reactant gas stream before the stream leaves the cell to limit acid loss. More recently, U.S. Pat. No. 7,678,478 discloses use of a particular electrolyte retaining matrix having a low phosphoric acid loss rate wherein the cell also includes a condensation zone to further increase retention of the phosphoric acid electrolyte within the fuel cell. (The aforesaid five patents are owned by the owner of all rights in the present disclosure.) Other disclosures such as U.S. Pat. No. 4,467,019 that issued on Aug. 21, 1984 shows use of an external reservoir containing acid electrolyte that may be directed into a PAFC to replace lost electrolyte.

While such disclosures have resulted in a longer operating life of PAFCs, they nonetheless include complex and costly structures and manufacturing methods that limit their effectiveness. Therefore, there is a need for an improved, efficient PAFC that increases a BOL weight of acid and that does not diminish fuel cell performance.

SUMMARY OF THE DISCLOSURE

The disclosure includes a fuel cell for generating electrical current from hydrogen containing reducing fluid fuel and oxygen containing oxidant reactant streams. The fuel cell includes an oxidant flow plate for directing flow of the oxidant reactant stream through the fuel cell. A porous cathode substrate layer having a first contact surface and an opposed second contact surface is disposed so that the first contact surface is secured adjacent the oxidant flow plate. A cathode catalyst layer is secured adjacent the second contact surface of the cathode substrate layer. A matrix having a first contact surface and an opposed second contact surface is configured for retaining a liquid electrolyte between the contact surfaces, and the matrix is positioned so that the first contact surface of the matrix is secured adjacent the cathode catalyst layer. An anode catalyst layer is secured adjacent the second contact surface of the matrix, and a first anode substrate layer has a first contact surface secured adjacent the anode catalyst layer. The first anode substrate layer also has an opposed second contact surface. At least one duplicate or second anode substrate layer also has a first contact surface and an opposed second contact surface, and is disposed so that its first contact surface is secured adjacent the second contact surface of the first anode substrate layer. The duplicate or second anode substrate layer is virtually identical to the first anode substrate layer. A fuel flow plate is secured adjacent the second contact surface of the at least one duplicate or second anode substrate layer for directing flow of the fuel reactant stream adjacent the duplicate anode substrate layer.

The cathode substrate and anode substrate layers are porous to permit passage of the gaseous reactant stream from the fuel flow plate through the anode substrate layers to and from the anode catalyst and to permit passage of the oxidant reactant stream from the oxidant flow plate through the cathode substrate layer to and from the cathode catalyst.

In a further embodiment, the liquid electrolyte is stored within the pores of the first and second anode substrate layers so that between about twenty percent (20%) and about fifty percent (50%) of the pore volume of the first and second anode substrate layers is filled with the liquid electrolyte at the beginning of life of the fuel cell. (For purposes herein, the word "about" is to mean plus or minus ten percent.)

The present disclosure also presents a method of operating a liquid electrolyte fuel cell including completely filling all available pore space within the electrolyte retaining matrix; filling between about twenty percent (20%) and about fifty percent (50%) of the pore volume of the first and second anode substrate layers with the liquid electrolyte; and, then directing flow of the oxidant reactant stream through the oxidant flow plate and directing flow fuel reactant stream through the fuel flow plate to commence operation of the fuel cell.

Accordingly, it is a general purpose to provide a fuel cell having multiple duplicate anode substrate layers that overcomes deficiencies of the prior art.

It is a more specific object to provide a fuel cell having multiple duplicate anode substrate layers that enhances efficiencies of operation of the fuel cell and decreases costs of manufacture and maintenance of the fuel cell.

DESCRIPTION OF THE PREFERRED EMBODIMENTS

Figure 1:
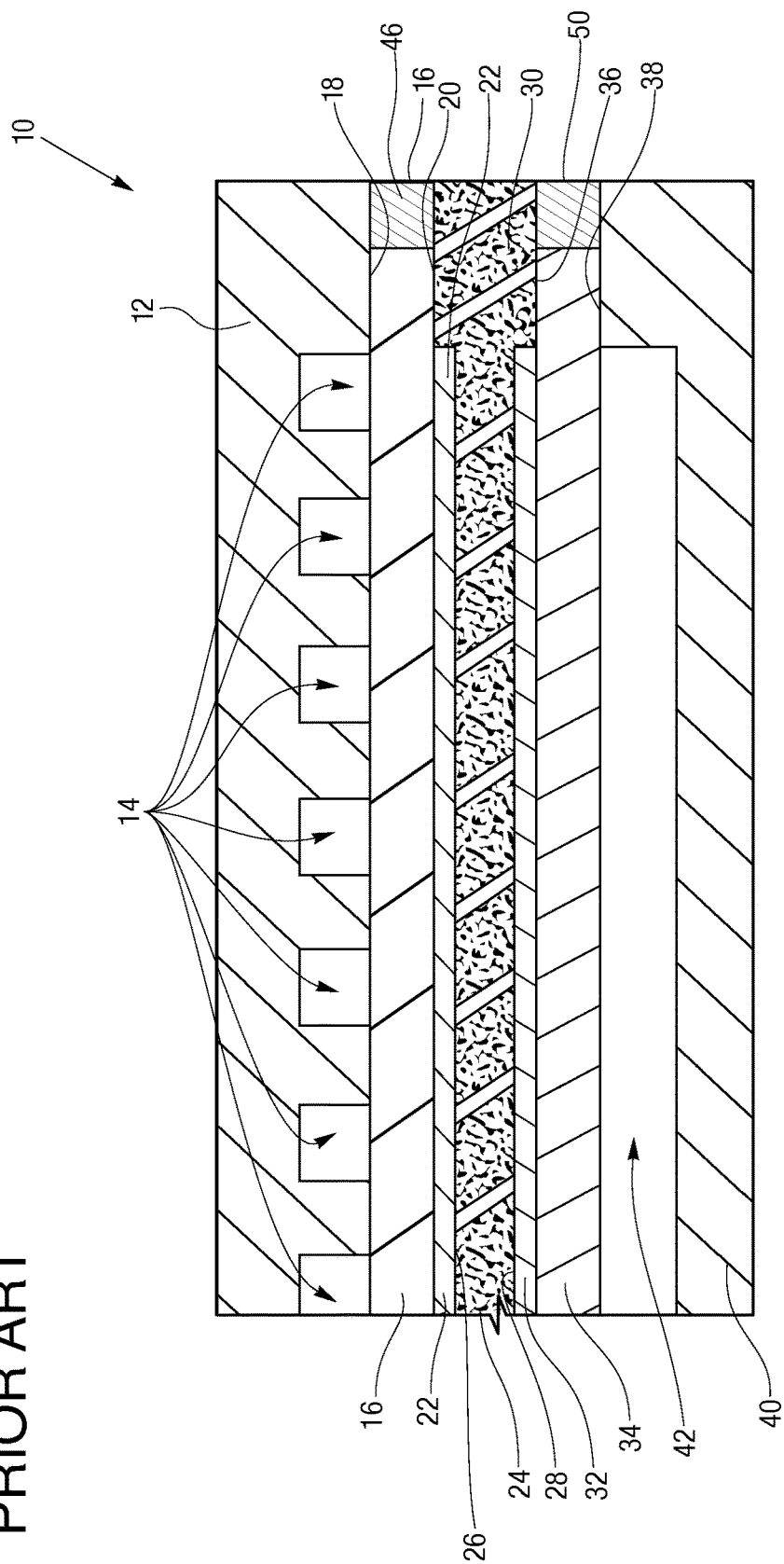
FIG. 1 is a simplified schematic drawing showing a prior art liquid electrolyte fuel cell.

Referring to the drawings in detail, a prior art liquid electrolyte fuel cell is shown in FIG. 1 and is generally designated by reference numeral 10. The prior art liquid electrolyte fuel cell 10 includes an oxidant flow plate 12 for directing flow of an oxidant reactant stream through the fuel cell 10 by directing flow of the oxidant stream through a plurality of oxidant flow channels 14 defined within the oxidant flow plate 12. A cathode substrate layer 16 having a first contact surface 18 and an opposed second contact surface 20 is disposed so that the first contact surface 18 is secured adjacent the plurality of oxidant flow channels 14 of the oxidant flow plate 12.

A cathode catalyst layer 22 is secured adjacent the second contact surface 20 of the cathode substrate layer 16. A matrix 24 having a first contact surface 26 and an opposed second contact surface 28 is configured for retaining a liquid electrolyte 30 (represented by schematic dots within the matrix 24), such as phosphoric acid between the contact surfaces 26, 28. The matrix 24 is positioned so that the first contact surface 24 of the matrix 24 is secured adjacent the cathode catalyst layer 22.

An anode catalyst layer 32 is secured adjacent the second contact surface 28 of the matrix 24. An anode substrate layer 34 has a first contact surface secured adjacent the anode catalyst layer 32. The anode substrate layer 34 also has an opposed second contact surface 38. A fuel flow plate 40 defines a plurality of fuel flow channels 42 (only one channel being shown in FIG. 1) and is secured adjacent the second contact surface 38 of the anode substrate layer 34 so that the fuel flow channel 42 is adjacent the second contact surface 38 for directing flow of the fuel reactant stream from the fuel flow channels 42 into pores defined by the anode substrate layer 34 so that the fuel may flow through the anode substrate layer 34 to contact the anode catalyst 32.

To prohibit flow of gaseous reactant streams, liquid electrolyte or liquid byproducts out of a perimeter of the fuel cell 10, the cathode substrate layer includes an edge seal 46; and, the anode substrate includes an edge seal 50. Such edge seals are well known in the prior art, as described for example in U.S. Pat. No. 4,269,642, which is owned by the owner of all rights in the present disclosure. As described above, during operation of the prior art liquid electrolyte fuel cell 10, the liquid electrolyte 30 may move, or "slosh" out of the cathode substrate layer 16 and into pores defined within the anode substrate layer 34. This decreases flow rate of gaseous reactant streams, and in particular a flow rate of the gaseous reactant fuel stream through the anode substrate layer 34 to the anode catalyst 32, thereby decreasing fuel cell performance.

Figure 2:
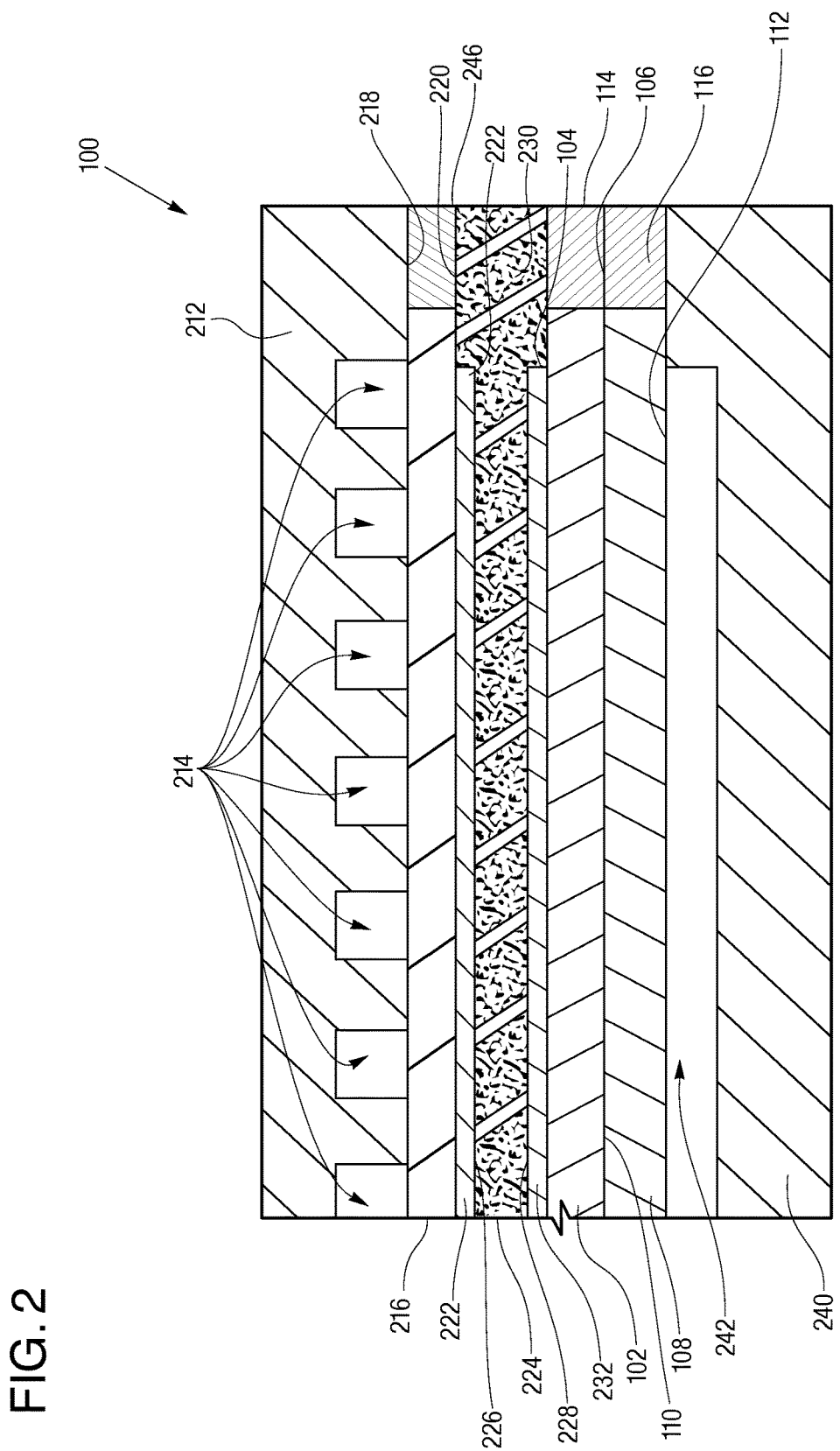
FIG. 2 is a simplified, schematic drawing showing a fuel cell having multiple duplicate anode substrate layers constructed in accordance with the present disclosure.

FIG. 2 shows an improved fuel cell of the present disclosure and is generally characterized by the reference numeral 100. For purposes of efficiency, the components of the prior art liquid electrolyte fuel cell 10 that are virtually identical to components of the FIG. 2 embodiment will be identified with two hundred added to the reference numerals of the FIG. 1 embodiment. For example, the oxidant flow plate 12 of the FIG. 1 prior art embodiment will be designated in FIG. 2 with the reference numeral 212. New components not shown in the prior art FIG. 1 but shown in FIG. 2 will be represented by reference numerals from 100 to 116.

The improved liquid electrolyte fuel cell 100 of the present disclosure includes the same components as described above for the prior art fuel cell and configured in the same dispositions; namely the oxidant flow plate 212, the adjacent cathode substrate layer 216, the adjacent cathode catalyst layer 222, the adjacent electrolyte retaining matrix 224, and the adjacent anode catalyst layer 232. However, the fuel cell 100 also includes a first anode substrate layer 102 having a first contact surface 104 secured adjacent the anode catalyst layer 232. The first anode substrate layer 102 also has an opposed second contact surface 106. At least one duplicate or second anode substrate layer 108 also has a first contact surface 110 and an opposed second contact surface 112, and is disposed so that its first contact surface 110 is secured adjacent the second contact surface 106 of the first anode substrate layer 102. The second contact surface 112 of the second anode substrate layer 108 is secured adjacent a flow channel 242 defined within the fuel flow plate 240 for directing flow of the fuel reactant stream from the fuel flow channel 242 through pores of the second anode substrate layer 108 and through the first anode substrate layer 102 to the anode catalyst 232. As with the prior art fuel cell 10, to prohibit flow of fluids out of a perimeter of the fuel cell 100 the improved fuel cell 100 the first anode substrate layer 102 also includes an edge seal 114 at a perimeter of the layer 102 and the second, duplicate anode substrate layer 108 also includes a perimeter edge seal 116.

The duplicate or second anode substrate layer 108 is virtually identical to the first anode substrate layer 102. (By the phrase "virtually identical to", it is meant that the anode substrate layers 102, 108 are interchangeable and are manufactured by the same processes.)

In a further embodiment, the electrolyte retaining matrix 224 defines a pore volume between the contact surfaces 226, 228 of the electrolyte retaining matrix 224, and the pore volume is about 100% saturated with the liquid electrolyte 230. Additionally, the liquid electrolyte is also stored within pores of the first anode substrate layer 102 and the duplicate second anode substrate layer 108 so that between about twenty percent (20%) and about fifty (50%) of the pore volume of the first and second anode substrate layers 102, 108 is filled with the liquid electrolyte at the beginning of life of the fuel cell 100. (For purposes herein, the word "about" is to mean plus or minus ten percent.)

As described above, the present disclosure also presents a method of operating a liquid electrolyte fuel cell 100 including completely filling all available pore space within the electrolyte retaining matrix 224 with a liquid electrolyte; filling between about twenty percent (20%) and about fifty percent (50%) of the pore volume of the first anode substrate layer 102 and second anode substrate layer 108 with the liquid electrolyte 230; and, then directing flow of the oxidant reactant stream through the oxidant flow plate 212 flow channels 214 and directing flow fuel reactant stream through the fuel flow plate 240 and fuel flow channels 242 to commence operation of the fuel cell.

To determine the effectiveness of use of the present disclosure, five exemplary tests were performed on five varying fuel cells. The impact of electrolyte fill level is normally evaluated by the fuel response at lower hydrogen concentrations. Fuel response or gain is defined as voltage difference between one-hundred percent H2 performance with lower percentage hydrogen performance. For example twenty-one percent fuel gain is one-hundred percent H2 performance compared to twenty-one percent H2 performance. Each fuel cell stack has to meet a BOL performance requirement. This requirement is evaluated by a performance curve. The data from performance curves of the five exemplary tests includes as the first example, a fuel cell similar to the prior art fuel cell 10 of FIG. 1, and includes as second, third, fourth and fifth examples fuel cells similar to the improved liquid electrolyte fuel cell 100 of the present disclosure.

In all five examples, the first anode substrate 102 had a nominal fill rate of thirty percent (30%), meaning that 30% of its total pore volume was filed with liquid electrolyte. In the second example, the second anode substrate layer 108 was present in the fuel cell 100, but had a 0% pore volume fill rate. In the third example, the second anode substrate layer 108 had a fill rate of 10%. In the fourth example, the second anode substrate layer 108 had a fill rate of 20%. In the fifth example, the second anode substrate layer 108 had a fill rate of 30%.

These five examples were tested under four different fuel concentrations, resulting in three fuel gain parameters at low fuel utilization and performance parameter tests at high fuel utilization. The first fuel gain parameter ("Fuel Gain A") was a 21% hydrogen gas gain measuring voltage change at varying current densities for the five examples. The second fuel gain parameter ("Fuel Gain B") was 10% hydrogen gas gain, again measuring voltage change at varying current densities for the five examples. The third fuel gain parameter ("Fuel Gain C") was 4% hydrogen gas gain, also measuring voltage change at varying current densities for the five examples. The first performance test was performed with a fuel concentration of 78% hydrogen/air at high reactant utilizations.

Example 1

One anode substrate layer, 30% fill rate: I. In Fuel Gain A, the example 1 fuel cell experienced a voltage response increase from 0.034V to 0.054V as current density (milliamps per square centimeter "mA/cm2") increased from 100 mA/cm2 to 500 mA/cm2. II. In Fuel Gain B, the fuel cell experienced a voltage response increase from 0.052V to 0.15V as current density increased from 100 mA/cm2 to 400 mA/cm2. III. In Fuel Gain C, the fuel cell experienced a voltage response increase from 0.085V to 0.165V as current density increased from 100 mA/cm2 to 200 mA/cm2. IV. In the performance test at high reactant utilizations, the fuel cell voltage decreased from 0.68V to 0.55V as the current density increased from 150 mA/cm2 to 500 mA/cm2.

Example 2

First anode substrate layer, 30% fill rate, second anode substrate layer, wettability treated with a 0% fill rate: I. In Fuel Gain A, the example 2 fuel cell experienced a voltage response increase from 0.033V to 0.041V as current density (milliamps per square centimeter "mA/cm2") increased from 100 mA/cm2 to 500 mA/cm2. II. In Fuel Gain B, the example 2 fuel cell experienced a voltage response increase from 0.05V to 0.065V as current density increased from 100 mA/cm2 to 400 mA/cm2. III. In Fuel Gain C, the example 2 fuel cell experienced a voltage response increase from 0.0755V to 0.103V as current density increased from 100 mA/cm2 to 200 mA/cm2. IV. In the performance test at high reactant utilizations, the example 2 fuel cell voltage decreased from 0.66V to 0.54V as the current density increased from 100 mA/cm2 to 500 mA/cm2.

Example 3

First anode substrate layer, 30% fill rate, second anode substrate layer, wettability treated with a 10% fill rate: I. In Fuel Gain A, the example 3 fuel cell experienced a voltage response increase from 0.032V to 0.042V as current density (milliamps per square centimeter "mA/cm2") increased from 100 mA/cm2 to 500 mA/cm2. II. In Fuel Gain B, the example 3 fuel cell experienced a voltage response increase from 0.051V to 0.082V as current density increased from 100 mA/cm2 to 400 mA/cm2. III. In Fuel Gain C, the example 3 fuel cell experienced a voltage response increase from 0.079V to 0.138V as current density increased from 100 mA/cm2 to 200 mA/cm2. IV. In the performance test at high reactant utilizations, the example 3 fuel cell voltage decreased from 0.65V to 0.45V as the current density increased from 100 mA/cm2 to 500 mA/cm2.

Example 4

First anode substrate layer, 30% fill rate, second anode substrate layer, wettability treated with a 20% fill rate: I. In Fuel Gain A, the example 4 fuel cell experienced a voltage response increase from 0.034V to 0.046V as current density (milliamps per square centimeter "mA/cm2") increased from 100 mA/cm2 to 500 mA/cm2. II. In Fuel Gain B, the example 4 fuel cell experienced a voltage response increase from 0.053V to 0.10V as current density increased from 100 mA/cm2 to 400 mA/cm2. III. In Fuel Gain C, the example 4 fuel cell experienced a voltage response increase from 0.084V to 0.146V as current density increased from 100 mA/cm2 to 200 mA/cm2. IV. In the performance test at high reactant utilizations, the example 4 fuel cell voltage decreased from 0.67V to 0.54V as the current density increased from 100 mA/cm2 to 500 mA/cm2.

Example 5

First anode substrate layer, 30% fill rate, second anode substrate layer, wettability treated with a 30% fill rate: I. In Fuel Gain A, the example 5 fuel cell experienced a voltage response increase from 0.034V to 0.054V as current density (milliamps per square centimeter "mA/cm2") increased from 100 mA/cm2 to 500 mA/cm2. II. In Fuel Gain B, the example 5 fuel cell experienced a voltage response increase from 0.057V to 0.17V as current density increased from 100 mA/cm2 to 400 mA/cm2. III. In Fuel Gain C, the example 5 fuel cell experienced a voltage response increase from 0.090V to 0.14V as current density increased from 100 mA/cm2 to 150 mA/cm2. IV. In the performance test at high reactant utilizations, the example 4 fuel cell voltage decreased from 0.68V to 0.56V as the current density increased from 100 mA/cm2 to 500 mA/cm2.

The data of the five examples above establishes that the fuel cell performance has no negative impact by adding an additional, duplicate anode substrate. Example 5 clearly establishes that duplicate anode substrates can have about same amount of acid as the first anode substrate. This excess amount of acid in duplicate anode substrates significantly increases fuel cell stack life by increasing the beginning of life acid reservoir. In addition, use of duplicate substrate helps the manufacturing of the fuel cell component. Overall, this makes fuel cell stack design cost effective, and makes a better value proposition for the fuel cell utilizing at least one duplicate anode substrate layer 108.

While the above disclosure has been presented with respect to the described and illustrated embodiments of a fuel cell having multiple duplicate anode substrate layers, it is to be understood that the disclosure is not to be limited to those alternatives and described embodiments. For example, it is to be understood the above descriptions and illustrations focus upon a liquid acid electrolyte, such as phosphoric acid. However, in fuel cells of the present disclosure it is to be understood that the electrolyte may be any liquid electrolyte capable of being utilized in a fuel cell. Additionally, it is to be understood that the fuel cell of the present disclosure will be typically disposed so that it will be one of many fuel cells cooperatively secured in a fuel cell stack assembly configured to produce a predetermined amount of electrical power and heat. Accordingly, reference should be made primarily to the following claims rather than the foregoing description to determine the scope of the disclosure.

What is claimed is:

1. A fuel cell for generating electrical current from hydrogen containing reducing fluid fuel and oxygen containing oxidant reactant streams, the fuel cell comprising:
   a. an oxidant flow plate for directing flow of the oxidant reactant stream through the fuel cell;
   b. a cathode substrate layer having a first contact surface and an opposed second contact surface and having the first contact surface secured adjacent the oxidant flow plate;
   c. a cathode catalyst layer secured adjacent the second contact surface of the cathode substrate layer;
   d. a matrix having a first contact surface and an opposed second contact surface for retaining a liquid electrolyte between the contact surfaces, and having the first contact surface secured adjacent the cathode catalyst layer;
   e. an anode catalyst layer secured adjacent the second contact surface of the matrix;
   f. a first anode substrate layer having a first contact surface and an opposed second contact surface, and having the first contact surface secured adjacent the anode catalyst layer;
   g. at least one duplicate anode substrate layer having a first contact surface and an opposed second contact surface, and having the first contact surface secured adjacent the second contact surface of the first anode substrate layer, wherein the duplicate anode substrate layer is virtually identical to the first anode substrate layer; and,
   h. a fuel flow plate secured adjacent the second contact surface of the at least one duplicate anode substrate layer for directing flow of the fuel reactant stream adjacent the duplicate anode substrate layer.

2. The fuel cell of claim 1, wherein a pore volume of the first anode substrate has a fill level at the beginning of life of the fuel cell of between about twenty percent and about fifty percent of the pore volume being filled with the liquid electrolyte, and wherein a pore volume of the at least one duplicate anode substrate layer has a fill level at the beginning of life of the fuel cell of equal to or less than the fill level of the pore volume of the first anode substrate being filled with the liquid electrolyte.

3. The fuel cell of claim 1, further comprising a plurality of duplicate anode substrate layers secured adjacent each other and wherein one of the plurality of duplicate anode substrate layers is secured adjacent the second contact surface of the first anode substrate layer.

4. A method of operating a liquid electrolyte fuel cell for generating electrical current from hydrogen containing reducing fluid fuel and oxygen containing oxidant reactant streams, the fuel cell including a matrix for retaining a liquid electrolyte within the matrix, a first surface of the matrix being secured adjacent a cathode catalyst and an opposed second surface of the matrix being secured adjacent an anode catalyst, a first anode substrate being secured adjacent the anode catalyst, and at least a second duplicate anode substrate layer being secured adjacent the first anode substrate layer, the method comprising:
   a. filling all available pore space within the matrix with a liquid electrolyte;
   b. filling about twenty to about fifty percent of the pore volume of the first anode substrate layer with the liquid electrolyte;
   c. filling the pore volume of the second anode substrate layer with equal to or less than the percent of the filled pore volume of the first anode substrate with the liquid electrolyte; and,
   d. then, directing flow of the oxidant reactant stream through the fuel cell to pass adjacent the cathode catalyst and directing flow of the fuel reactant stream through the anode substrate layers and adjacent the anode catalyst to commence operation of the fuel cell.

* * * * *